United States Patent Office 3,188,812
Patented June 15, 1965

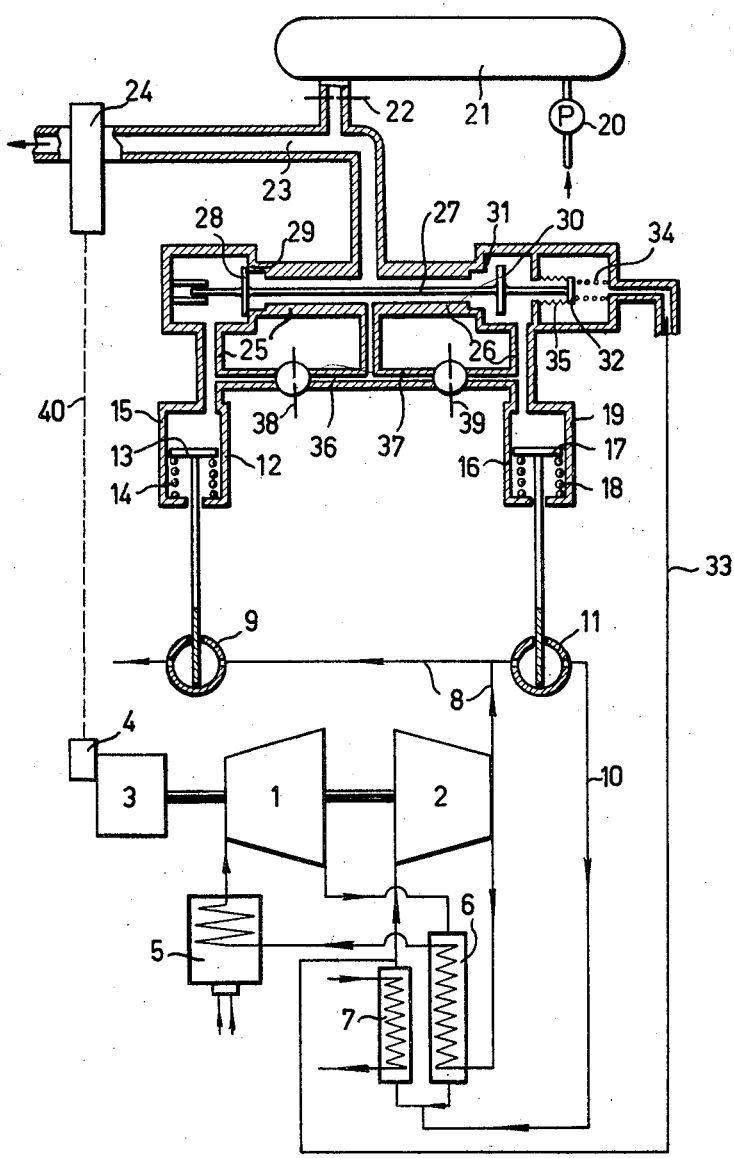

3,188,812
EMERGENCY SHUT-DOWN DEVICE FOR GAS-TURBINE POWER PLANT
Hermann Knirsch, Zurich, Switzerland, assignor to Escher Wyss Aktiengesellschaft, Zurich, Switzerland, a corporation of Switzerland
Filed Apr. 16, 1962, Ser. No. 187,746
Claims priority, application Switzerland, Apr. 24, 1961, 4,768/61
5 Claims. (Cl. 60—59)

This invention relates to a quick-acting emergency shut-down device for a gas-turbine power plant with closed circuit of the working medium, in which for quick-acting shut-down, there is provided both an escape valve, through which working medium can escape into a space outside said closed circuit, generally into the atmosphere, from the high-pressure part of the circuit, and also a by-pass valve, through which working medium can pass from the high-pressure part of the circuit into its low-pressure part.

In addition to the devices for the regulation of the gas turbine power plant in normal operation, emergency devices must also be provided for permitting in case of necessity rapid stopping of the plant, that is to say, quick-acting shut-down. For this purpose, known plants have an escape valve, through which in the event of quick-acting shut-down the working medium can escape into the atmosphere from the high-pressure part of the circuit, whereby the driving power of the turbine falls rapidly almost to zero. If a valve-controlled by-pass extending from compressor outlet to compressor inlet is used as a regulating device, in the case of quick-acting shut-down, this valve is generally opened at the same time as the escape valve, the braking effect on the compressor being thereby reinforced.

This type of quick-acting shut-down device has some disadvantages.

In the case of quick-acting shut-down from full load, that is to say with maximum pressure level in the circuit, the pressure in the low-pressure part rises somewhat at first due to the by-pass flow, despite the simultaneous escape of working medium, whereby there is a risk of the pressure assuming for a short time inadmissible high values.

In the case of quick-acting shut-down from very low load, that is to say, a very low pressure level in the circuit, the braking effect on the compressor is relatively slight, due to the low density of the working medium. The kinetic energy of the rotating machine parts, however, does not depend on the load carried before the quick-acting shut-down, but only on their moment of inertia and speed, and in hot-air turbines with pressure-level control, the speed is kept as far as possible constant. The speed of the machines consequently falls slowly, especially when the torque absorbed by the driven working machine is small on quick-acting shut-down, for example, in the case of a generator disconnected from the mains. The machine group, therefore, has still a relatively high speed when the pressure in the high-pressure part of the circuit has already dropped to atmospheric pressure. The compressor will then produce a certain underpressure in the low-pressure part, despite the opened by-pass valve, so that bearing oil or sealing oil can be drawn into the circuit. This involves fouling of the circuit, and for reasons of heat transfer is particularly undesirable in a hot-air turbine plant.

This latter phenomenon is found to be particularly pronounced and disturbing in multi-shaft plants, in which the working machine is driven by its own turbine, while the compressor and its driving machine form a self-contained unit, not coupled mechanically to the working turbine.

The invention is based on the knowledge set forth in the foregoing and its object is to obviate the disadvantages of the known quick-acting shut-down device. In an emergency shut-down device of the kind hereinbefore described, for this purpose control elements are provided which, in quick-acting shut-down in the case of high power, first of all open only the escape valve, and open the by-pass valve only after a delay time, while in the case of low power, they open first of all only the by-pass valve and then also open the escape valve only after a delay time.

The shutdown device of this invention is provided in addition to the normal power controls used in power plants of the hot gas closed cycle type. These conventional controls are not illustrated but may be of the type disclosed in U.S. Patent No. 2,414,170.

A constructional example of the invention is represented in simplified form in the drawing. The turbogroup of the plant has a turbine 1, a compressor 2 and a generator 3 with a speed governor 4. The gaseous working medium, that is to say air, is heated in an air-heater 5, passes through the turbine 1, then through a heat exchanger 6 and a cooler 7, and is compressed in the compressor 2. The compressed working medium is passed through the heat exchanger 6 and into the air heater 5 again. The flow path of the compressed working medium, extending from the exit of compressor 2 to the inlet of turbine 1 is called the high-pressure part of the circuit and the flow path of the expanded working medium, extending from the exit of turbine 1 to the inlet of compressor 2 is called the low-pressure part of the circuit.

Connected to the compressor exit housing is a pipeline 8 leading to an escape valve 9, through which the working medium can escape into the atmosphere from the high-pressure part of the working medium circuit. Branching off the pipeline 8 is a pipeline 10 connecting the high-pressure part of the working medium circuit to the low-pressure part of the latter, and having a by-pass valve 11.

The valve 9 is operated by means of a servomotor 12 with piston 13, spring 14 and cylinder 15, and the valve 11 is operated by means of a servomotor 16, with piston 17, spring 18 and cylinder 19. An oil accumulator 21 fed by an oil pump 20 supplies control oil at a definite predetermined pressure, which leaves through a throttling point 22 and a pipeline 23. One end of the pipeline 23 is normally closed by an emergency pressure release valve 24. At its other end, the pipeline 23 branches into two main pressure-medium pipes 25 and 26, leading respectively to the servomotors 12 and 16.

The main pipes 25 and 26 can be closed alternately by a change-over valve 27, a disc 28 being seated on a seating 29, and a disc 30 on a seating 31. The valve 27 is moved by means of a piston 32, one face of which is in communication with the pressure-oil contents of the pipeline 23, and the other face of which is in communication via a pipeline 33 with the low-pressure part of the working medium circuit of the gas-turbine plant. This other side is also under the action of a compression spring 34. A diaphragm 35 separates the two pressures media loading the piston faces. By-pass pipes 36 and 37 with adjustable throttling points 38 and 39 by-pass respectively the closure 28, 29 produced by means of the disc 28 and seating 29 and the closure 30, 31 produced by means of the disc 30 and seating 31. An action connection 40 ensures operation of the emergency pressure release valve 24 in accordance with the speed or other magnitudes of the gas-turbine plant.

In normal operation of the gas-turbine plant, the servomotor 12 of the escape valve 9 and the servomotor 16 of the by-pass valve 11 are under the constant control oil pressure prevailing in the oil accumulator 21, the two valves being closed. The emergency pressure release valve 24 is also closed.

The control oil pressure and the spring 34 are matched to the pressure of the working medium carried by the pipeline 33 to the piston 32 of the change-over valve 27, such that the valve 27 at low working-medium pressure is forced into its right-hand end position in the drawing, and at high working-medium pressure is forced into its other, left-hand end position. The pressure at which change-over of the valve 27 occurs can be varied by adjustment or replacement of the spring 34.

At low pressure of the working medium, the valve 27 accordingly occupies the position shown. If in this state of the working medium, that is to say at low power of the plant, the emergency pressure release valve 24 is opened, whereby the oil pressure in the pipe 23 collapses, the oil pressure in the servomotor 16 also falls and the by-pass valve 11 is at once opened. The oil in the servomotor 12, on the contrary, is shut off from the pipe 23 by the closure 28, 29 and can only flow away slowly via the by-pass pipe 36 with the throttling point 38. If the plant runs at low power, therefore, in the case of quick-acting shut-down, first of all only the by-pass valve 11 opens and then with a delay also the escape valve 9. The delay time, amounting to a few seconds, may be adjusted by adjustment of the throttling point, so that on full opening of the escape valve 9, the speed of the machine group will already have dropped almost to zero.

At high pressure of the working medium, i.e. at high power of the gas-turbine plant, the change-over valve 27 is situated in its other, i.e. left-hand end position. If, therefore, at high power of the plant, the emergency pressure release valve 24 is opened, the oil pressure in the servomotor 12 falls at once and the escape valve 9 will be opened at once. The oil in the servomotor 16, on the contrary, is shut off from the pipe 23 and can only flow away slowly within an adjustable delay time via the by-pass pipe 37 with the throttling point 39. On quick-acting shut-down of the plant running at high power, therefore, first of all only the escape valve 9 opens, and only after a delay time also the by-pass valve 11.

In this way, on quick-acting shut-down of the plant running at low power, the compressor is braked more rapidly, and no under-pressure can be produced in the low-pressure side of the plant which would draw bearing oil or sealing oil into the working medium circuit. On quick-acting shut-down of the plant running at high power, however, increase in the pressure in the low-pressure part to inadmissibly high values is prevented.

The application of the invention is not limited to the embodiment shown in the example; other embodiments will suggest themselves to those skilled in the art.

What is claimed is:

1. In a closed-circuit gas turbine power plant of the type including turbine means, compressing means, a high pressure part providing a flow communication between the inlet of the turbine means and the outlet of the compressing means and a low pressure part providing a flow communication between the outlet of the turbine means and the inlet of the compressing means, the improvement which comprises emergency shut-down means comprising an escape valve which, though normally closed, is capable of connecting said high pressure part with a space outside said circuit; a by-pass connecting said high pressure part with said low pressure part; a normally closed by-pass valve in said by-pass; actuating means operatively connected with the escape valve and the by-pass valve and effective when energized to open said valves sequentially in timed relation, changeover means effective when said plant is operating at high power to cause said actuating means to open said escape valve first, and effective when said plant is operating at low power to cause said actuating means to open said by-pass valve first; and means operable to energize said actuating means.

2. The combination defined in claim 1 in which
 (a) the actuating means comprises:
  (1) first and second normally pressurized fluid motors, the first connected with the escape valve and holding it closed when the motor is pressurized, and the second motor connected with the by-pass valve and holding it closed when the motor is pressurized; and
  (2) a normally closed pressure relief valve having an inlet;
 (b) the changeover means comprises:
  (1) changeover valve means shiftable between first and second positions, the changeover valve means in first position establishing free communication between said inlet and the first motor and restricted communication between the second motor and said inlet, the changeover valve means in its second position establishing free communication between said second motor and said inlet and restricted comunication between said first motor and said inlet; and
  (2) means for shifting said changeover valve means to first position when the power plant operates at high power and to second position when the power plant operates at low power; and
 (c) the means to energize the actuating means opens the pressure relief valve.

3. The combination defined in claim 2 in which the means for shifting the changeover valve means comprises a piston motor, a piston of said motor being subjected at one of its faces to a medium the pressure of which varies with the power of the plant and also subjected to a substantially constant counter-acting force, and arranged in such a manner that the change-over valve means is held in its first position when the pressure of the said medium is higher than a certain value intermediate its lowest and highest pressure and is held in its second position when the pressure of the said medium is lower than said certain value.

4. The combination defined in claim 3 comprising a flow connection between a point of the working medium circuit and the change-over valve means arranged so as to subject said one face of the said piston the the pressure prevailing at the said point of the working medium circuit.

5. The combination defined in claim 3 in which the other face of the said piston is subjected to the pressure fluid which serves to operate the servomotors, so as to counter-act the medium pressure varying with the power of the plant.

References Cited by the Examiner

UNITED STATES PATENTS

| | | | |
|---|---|---|---|
| 1,704,403 | 3/29 | Nash | 137—25 |
| 1,959,373 | 5/34 | Law | 137—31 X |
| 2,338,548 | 1/44 | Sheppard | 137—25 |
| 2,540,691 | 2/51 | Reese | 137—27 X |
| 2,866,470 | 12/58 | Hold | 137—24 |
| 2,926,680 | 3/60 | Eggenberger | 137—24 |

JULIUS E. WEST, *Primary Examiner.*

CLARENCE R. GORDON, *Examiner.*